United States Patent [19]

Ohura et al.

[11] Patent Number: 5,502,085
[45] Date of Patent: Mar. 26, 1996

[54] PRESSURE-SENSITIVE ADHESIVE HAVING EXCELLENT HEAT-RESISTANCE, ADHESIVE SHEETS THEREOF, AND METHODS FOR PRODUCING THEM

[75] Inventors: Masahiro Ohura; Takao Yoshikawa; Yasuyuki Tokunaga; Takaaki Moriyama; Tetsuo Inoue, all of Osaka, Japan

[73] Assignee: Nitto Denko Corporation, Osaka, Japan

[21] Appl. No.: 283,676

[22] Filed: Aug. 1, 1994

Related U.S. Application Data

[63] Continuation of Ser. No. 37,397, Mar. 26, 1993, abandoned.

[30] Foreign Application Priority Data

Mar. 27, 1992 [JP] Japan .................................... 4-101808
Mar. 27, 1992 [JP] Japan .................................... 4-101809

[51] Int. Cl.$^6$ ....................................................... C08F 2/46
[52] U.S. Cl. ........................... 522/106; 522/104; 526/82; 524/833
[58] Field of Search ................................... 524/833, 558, 524/560; 522/106, 104, 85, 76, 75; 526/82

[56] References Cited

U.S. PATENT DOCUMENTS

| | | | |
|---|---|---|---|
| 4,379,201 | 4/1983 | Heilmann et al. | 428/345 |
| 4,665,106 | 5/1987 | Ohta et al. | 526/318 |
| 4,943,461 | 7/1990 | Karim | 525/218 |
| 4,999,242 | 3/1991 | Ishiwata et al. | 428/345 |

FOREIGN PATENT DOCUMENTS

| | | |
|---|---|---|
| 1594193 | 2/1966 | Germany . |
| 654026 | 5/1951 | United Kingdom . |

OTHER PUBLICATIONS

Handbook of Adhesives, Skeist ed. 3rd Edition Van Nostrand Reinhold, N.Y. 1990.

*Primary Examiner*—Jeffrey T. Smith
*Attorney, Agent, or Firm*—Sughrue, Mion, Zinn, Macpeak & Seas

[57] ABSTRACT

A photopolymerized acrylic pressure-sensitive adhesive having excellent heat-resistance, an adhesive sheet using the adhesive, and methods for producing the adhesive and the adhesive sheet, are disclosed. The pressure-sensitive adhesive sheet having excellent heat resistance comprising a photopolymerization product of a composition comprising;

a) 100 parts by weight of monomers comprising from 70 to 100% by weight of a (meth)acrylic acid alkyl ester having from 2 to 14 carbon atoms in the alkyl moiety, and from 30 to 0% by weight of a monoethylenically unsaturated monomer copolymerizable with the (meth)acrylic acid alkyl ester, b) from 0.02 to 20 parts by weight of a radical chain inhibitor, c) up to 5 parts by weight of a polyfunctional (meth)acrylate as a crosslinking agent, and d) from 0.01 to 5 parts by weight of a photopolymerization initiator.

10 Claims, No Drawings

PRESSURE-SENSITIVE ADHESIVE HAVING EXCELLENT HEAT-RESISTANCE, ADHESIVE SHEETS THEREOF, AND METHODS FOR PRODUCING THEM

This is a Continuation of application No. 08/037,397 filed Mar. 26, 1993 now abandoned.

FIELD OF THE INVENTION

The present invention relates to a photopolymerized acrylic pressure-sensitive adhesive, an adhesive sheet or tape obtained by forming a layer of the pressure-sensitive adhesive on one surface or both surfaces of a substrate, and methods for producing them.

BACKGROUND OF THE INVENTION

An acrylic pressure-sensitive adhesive has been widely used as a pressure-sensitive adhesive having excellent pressure-sensitive adhesive force, cohesive force, and aging resistance. In particular, recently, the demand of the pressure-sensitive adhesive tape for heat resistant uses such as a fixing tape for bonding parts or a masking tape in a soldering step at assembling electronic parts has been increased.

An acrylic pressure-sensitive adhesive is generally produced by copolymerizing an acrylic acid alkyl ester having 2 to 14 carbon atoms in the alkyl moiety as the main component and, if necessary, a small amount of a polar component such as acrylic acid, etc., and a monomer having a high glass transition temperature, such as styrene, vinyl acetate, etc., to balance peeling characteristics, tack, etc. Also, the copolymer is crosslinked for the purposes of improving heat resistance and cohesive force.

In producing such an acrylic pressure-sensitive adhesive, usually, after solution-polymerizing a monomer in an organic solvent, a tackifying resin, a crosslinking agent, etc., are compounded with the polymer solution formed to obtain an adhesive composition, and after coating the adhesive composition on a substrate, a large amount of the organic solvent is removed by heating to obtain an adhesive sheet or tape.

However, in the conventional production, the average molecular weight of the polymer or copolymer obtained is at most 1,000,000 due to the chain transfer into the organic solvent at the polymerization. Therefore, if the polymer or copolymer is not crosslinked, the adhesive lacks in the retention performance, and even if the polymer is crosslinked, when the temperature becomes higher than 100° C., the cohesive force is decreased and the retention performance is greatly decreased.

Accordingly, when the acrylic pressure-sensitive adhesive is used for a fixing tape or a masking tape in a soldering step, there is a problem that slipping of the tape and oozing of the adhesive occur during use. Furthermore, there are problems that a low-boiling organic solvent used for the production of the adhesive remains in these tapes, which evaporates and expands at a high temperature to cause foaming, swelling, slipping, etc., at the adhered surface, and also electronic parts are corroded by the evaporated gas.

On the other hand, recently, from a standpoint of a safety and an environmental hygiene caused by the use of an organic solvent, photopolymerized type acrylic pressure-sensitive adhesives have been proposed. For example, U.S. Pat. No. 4,181,752 discloses a method for preparing a pressure-sensitive adhesive without using an organic solvent by photopolymerizing an acrylic acid alkyl ester and a modifying monomer on a substrate. Also, a transfer-type pressure-sensitive adhesive obtained by forming the pressure-sensitive adhesive similar to the above pressure-sensitive adhesive on a releasing liner and transferring the adhesive onto a substrate is known.

By such a photopolymerized type pressure-sensitive adhesive, the above-described various problems caused by the use of an organic solvent are all avoided and also the molecular weight of the polymer can be increased by irradiating light having a relatively weak intensity. Therefore, it has been expected that a pressure-sensitive adhesive having a high degree of crosslinking and a large cohesive force is obtained.

However, since the above-described conventional photopolymerized type pressure-sensitive adhesive is photopolymerized in a complete bulk state, the rate of polymerization by no means becomes 100% by weight and several percent by weight of unreacted monomer remains. The unreacted monomer not only becomes the cause of an unpleasant odor but also functions as a plasticizer of the adhesive to cause great decrease in the cohesive force at high temperature and cause swelling of the adhered surface and the contamination of a gas by evaporation of the monomer at high temperature. This has refused use of the adhesive in heat-resistant uses.

For decreasing the amount of the unreacted monomer, it may be considered to improve the rate of polymerization by using a large amount of a photopolymerization initiator, but since in such a case, with increase of a radical concentration of a photopolymerization initiator, the molecular weight of the polymer formed is decreased, and the cohesive force of the pressure-sensitive adhesive at high temperature is decreased. Hence a high heat resistance desired for a soldering step, etc., is not attained.

JP-A-2-60981 (the term "JP-A" as used herein means an "unexamined published Japanese patent application") discloses that by conducting the photopolymerization for producing a pressure-sensitive adhesive tape in two stages, the amount of the residual monomer is decreased and the productivity is improved by improving the rate of polymerization.

However, in this method, there are disadvantages that since the residual monomer is consumed in the 2nd stage, it is required to irradiate with light having a intensity higher than that of the light in the 1st stage, whereby the formation of low molecular weight materials cannot be prevented and hence although the pressure-sensitive adhesive has a heat resistance of about 100° C., in a heat resistant soldering use at higher temperature, bleeding of the low molecular weight materials causes prints and stains at the back surface of the pressure-sensitive adhesive tape and also causes peeling off, slipping, and falling of the pressure-sensitive adhesive tape.

Furthermore, recently, the requirement for a heat resistant use tends to more increase and in particular, the durability and reliability of a pressure-sensitive adhesive used under high temperature for a long period of time have been required. For example, in the case of using the adhesive under high temperature for a long period of time, the decomposition and oxidation of the pressure-sensitive adhesive occur and by hardening and flowing out of the pressure-sensitive adhesive and the generation of decomposed gases, decrease in the performance of the pressure-sensitive adhesive and contamination of environmental portions become a problem. The conventional pressure-sensitive adhesive has a high degree of crosslinking and a large cohesive force as described above, but is insufficient in the point of stability when it is used at high temperature for a long period of time, and from this standpoint, use of a conventional pressure-sensitive adhesive in heat resistant uses has been obstructed.

SUMMARY OF THE INVENTION

In view of such problems in the conventional techniques, the object of the present invention is to provide a pressure-sensitive adhesive having heat resistant uses of higher than 100° C., in particular, having an excellent heat resistance at very high temperature up to 260° C. as in a soldering step and also having a long-time high-temperature stability, capable of avoiding the occurrence of the problems by the residual unreacted monomer and the formation of low molecular weight materials, and to pressure-sensitive adhesive sheets using the pressure-sensitive adhesive.

As a result of various investigations for attaining the above object, the inventors have found that by adding a radical chain inhibitor capable of restraining occurrence of the deterioration by oxidation and decomposition under high temperature for a long period of time to an adhesive composition to be photopolymerized, a pressure-sensitive adhesive having excellent long-time high-temperature stability which is not deteriorated by oxidation and decomposition caused by a radical reaction as in the conventional techniques can be obtained.

However, since such a radical chain inhibitor generally acts as a chain terminator for the photopolymerization reaction, the radical chain inhibitor hinders the photopolymerization, which results in leaving a large amount of the unreacted monomer. Thus, it is desired to restrain the amount of the radical chain inhibitor used in a small amount, but in this case, a problem occurs in the long-time high-temperature stability under more severe conditions.

Thus, as a result of making further investigations, the inventors have discovered that by adding a sufficient amount of a radical chain inhibitor for preventing the deterioration by oxidation and decomposition caused by a radical reaction to the adhesive composition to be photopolymerized to improve the long-time high-temperature stability and on the other hand, by overcoming the problem on the residual unreacted monomer due to hindrance of the polymerization caused by the use of the radical chain inhibitor described above by removing the residual monomer after photopolymerization by drying under heating without improving the rate of polymerization as in the conventional case, the problems of adhesion hindrance, etc., due to the residual monomer and the formation of the low molecular weight materials can be essentially avoided and have succeeded in accomplishing the present invention based on the discovery.

According to one embodiment of the present invention, there is provided a pressure-sensitive adhesive having excellent heat resistance comprising a photopolymerization product of a composition comprising;

a) 100 parts by weight of monomers comprising from 70 to 100% by weight of a (meth)acrylic acid alkyl ester having from 2 to 14 carbon atoms in the alkyl moiety, and from 30 to 0% by weight of a monoethylenically unsaturated monomer copolymerizable with the (meth)acrylic acid alkyl ester, b) from 0.02 to 20 parts by weight of a radical chain inhibitor, c) up to 5 parts by weight of a polyfunctional (meth)acrylate as a crosslinking agent, and d) from 0.01 to 5 parts by weight of a photopolymerization initiator.

According to another embodiment of the present invention, there is provided an adhesive sheet or tape comprising a substrate having formed on one surface or both the surfaces thereof a layer of the pressure-sensitive adhesive.

According to still another embodiment of the present invention, there is provided a method for producing a pressure-sensitive adhesive having excellent heat resistance, which comprises irradiating a composition comprising;

a) 100 parts by weight of monomers comprising from 70 to 100% by weight of a (meth)acrylic acid alkyl ester having from 2 to 14 carbon atoms in the alkyl moiety, and from 30 to 0% by weight of a monoethylenically unsaturated monomer copolymerizable with the (meth)acrylic acid alkyl ester, b) from 0.02 to 20 parts by weight of a radical chain inhibitor, c) up to 5 parts by weight of a polyfunctional (meth)acrylate as a crosslinking agent, and d) from 0.01 to 5 parts by weight of a photopolymerization initiator, with ultraviolet rays and drying the product by heating.

According to further embodiment of the present invention, there is provided a method for producing an adhesive sheet or tape, which comprises forming a layer of the pressure-sensitive adhesive produced by the above-described method on one surface or both the surfaces of a substrate.

DETAILED DESCRIPTION OF THE INVENTION

The present invention is described in more detail below.

The (meth)acrylic acid alkyl ester used in the composition of the present invention is the main component of the monomers as the component a). A monofunctional unsaturated (meth)acrylate of a non-tertiary alkyl alcohol is preferably used and the component a) has from 2 to 14 carbon atoms in the alkyl moiety. Examples of the (meth)acrylic acid alkyl ester are ethyl (meth)acrylate, butyl (meth)acrylate, isoamyl (meth)acrylate, n-hexyl (meth)acrylate, 2-ethylhexyl (meth)acrylate, isooctyl (meth)acrylate, isononyl (meth)acrylate, decyl (meth)acrylate, and dodecyl (meth)acrylate. Those may be used alone or as mixtures thereof.

The monoethylenically unsaturated monomer copolymerizable with the (meth)acrylic acid alkyl ester is used to improve the adhesive property by the introduction of a functional group and a polar group by copolymerizing with the (meth)acrylic acid alkyl ester or to improve and modify the cohesive force and the heat resistance by controlling the glass transition temperature of the copolymer.

Examples of the monoethylenically unsaturated monomer are acrylic acid, itaconic acid, sulfopropyl acrylate, hydroxyalkyl acrylate, cyanoalkyl acrylate, acrylamide, substituted acrylamide, N-vinylcaprolactam, acrylonitrile, 2-methoxyethyl acrylate, glycidyl acrylate, and vinyl acetate. Those can be used alone or as mixtures thereof according to the purpose.

As to the using ratio of the (meth)acrylic acid alkyl ester and the monoethylenically unsaturated monomer copolymerizable therewith, it is preferred that the (meth)acrylic acid alkyl ester as the main component is from 70 to 100% by weight, preferably from 85 to 95% by weight, and the monoethylenically unsaturated monomer copolymerizable therewith is from 30 to 0% by weight, preferably from 15 to 5% by weight.

By using the two kinds of monomers in the ratio, the adhesive property, the cohesive force, etc., of the pressure-sensitive adhesive can be balanced well.

Examples of the radical chain inhibitor used as the component b) in the composition of the present invention are triethylene glycol-bis[3-(3-t-butyl-5-methyl- 4-hydroxyphenyl)propionate], 1,6-hexanediol-bis[ 3-(3,5-di-t-butyl-4-hydroxyphenyl)propionate], 2,4-bis-(n-octylthio)- 6-(4-hydroxy-3,5-di-t-butylanilino)- 1,3,5-triazine, pentaerythrityl-tetrakis[3-(3,5-di-t-butyl- 4-hydroxyphenyl)propionate], 2,2-thiodiethylene-bis[ 3-(3,5-di-t-butyl-4-hydroxyphenyl) propionate], octadecyl-3-(3,5-di-t-butyl-4-hydroxyphenyl) propionate, N,N'-hexamethylene-bis(3,5-di-t-butyl-4-hydroxyhydrocinnamamide, 3,5-di-t-butyl-4-hydroxy-benzylphosphonate diethyl ester, 1,3,5-trimethyl-2,4,6-tris(3,5-di-t-butyl- 4-hydroxybenzyl)benzene, bis(ethyl 3,5-di-t-butyl-4-hydroxybenzylphosphonate)calcium, tris(3,5-di-t-butyl-4-hydroxybenzyl)isocyanurate, octylated diphenylamine, 2,4-bis[(octylthio)methyl]-o-cresol, N,N'-bis[3-(3,5-di-t-butyl- 4-hydroxyphenyl)propionyl]hydrazine, tris(2,4-di-t-butylphenyl)phosphite, 2,2,4-trimethyl-1, 2-dihydroquinoline, poly(2,2,4-trimethyl-1,2-dihydroquinoline), 6-ethoxy-1,2-dihydro-2,2,4-trimethylquinoline, tetra-bismethylene- 3-(3',5'-di-t-butyl-4'-hydroxyphenyl)propionate methane, phenyl-1-naphthylamine, diphenylamine, 4,4'-bis(α,α-dimethylbenzyl)diphenylamine, p-(p-toluene-sulfonylamido)diphenylamine, N,N'-di-2-naphthyl-p-phenylenediamine, N,N'-diphenyl-p-phenylenediamine, N-phenyl-N'-isopropyl-p-phenylenediamine, N-phenyl-N'-(1,3-dimethylbutyl)-p-phenylenediamine, N-phenyl-N'-(3-methacryloyloxy- 2-hydroxypropyl)-p-phenylenediamine, 2,6-di-t-butyl- 4-methylphenol, 2,6-di-t-butyl-4-ethylphenol, (α-methylbenzyl)phenol, di-(α-methylbenzyl)phenol, tri-(α-methylbenzyl)phenol, 2,2'-methylenebis(4-ethyl-6-t-butylphenol), 2,2'-methylenebis(4-methyl-6-t-butylphenol), 4,4'-butylidenebis(3-methyl-6-t-butylphenol), 4,4'-thio-bis (3-methyl-6-t-butylphenol), 2,5-di-t-butylhydroquinone, 2,5-di-t-amylhydroquinone, 2-mercaptobenzimidazole, 2-mercaptomethylbenzimidazole, bis(2-mercaptobenzimidazole) zinc, bis(2-mercaptomethylbenzimidazole) zinc, nickel diethylthiocarbamate, nickel dibutyldithiocarbamate, 1,3-bis(dimethylaminopropyl)-2-thiourea, tributylthiourea, tris(nonylphenyl) phosphite, dilauryl thiodipropionate, 1,1, 3-tris(3-t-butyl-6-methyl-4-hydroxyphenyl)butane, 3,9-bis{2-[3-(3-t-butyl-4-hydroxy-5-methylphenyl)propionyloxy] -1,1-dimethylethyl}-2,4,8,10-tetraoxaspiro[ 5,5] undecane, bis(nonylphenyl)pentaerythritol-di-phosphite, bis(2,4-di-t-butylphenyl)pentaerythritol-di-phosphite, bis(2, 6-di-t-butyl-4-methylphenyl)pentaerythritol-di-phosphite, bis(2,6-di-t-butyl-4-methylphenyl)pentaerythritol-di-phosphite, 2,2-methylene-bis( 4,6-di-t-butylphenyl) octylphosphite, trisphenyl phosphite, tetrakis[methylene-3-(dodecylthio)propionate] methane, etc.

Also, compounds shown by the following formulae (I) to (V) can be used as one kind of the radical chain inhibitors.

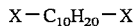  (I)

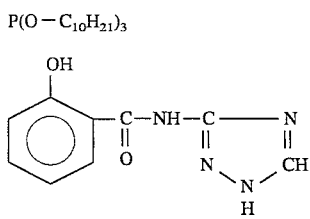  (II)

$X-C_{10}H_{20}-X$  (III)

wherein X is a monovalent group represented by the formula

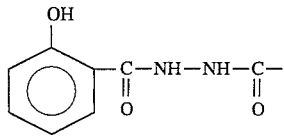

$(Y)_2CH-CH_2-CH-Y$  (IV)
　　　　　　　　｜
　　　　　　　　$CH_3$ wherein Y is a monovalent group represented by the formula

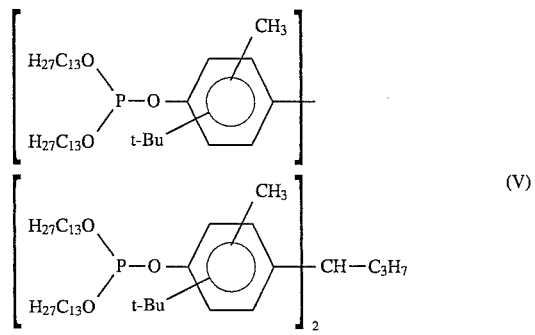

(V)

In the composition of the present invention, at least one kind of the above-described various compounds is used as the radical chain inhibitor of the component b). The amount of the radical chain inhibitor is from 0.02 to 20 parts by weight, preferably from 0.1 to 10 parts by weight, per 100 parts by weight of the monomer as the component a). If the amount of the radical chain inhibitor is less than 0.02 part by weight, the long-time high-temperature stability of the pressure-sensitive adhesive becomes poor, while if the amount thereof is more than 20 parts by weight, the radical chain inhibitor generally acts as a chain stopper of the photopolymerization reaction, and the radical chain inhibitor hinders the polymerization to remain a too large amount of an unreacted monomer, whereby a sufficient removal effect of the residual monomer is not obtained in the subsequent drying step, and also the radical chain inhibitor greatly causes decrease in the molecular weight of the polymer formed, resulting in decreasing the adhesive force and the cohesive force of the pressure-sensitive adhesive at a high temperature. Thus, the employment of the amount thereof outside the above-described range is undesirable.

The composition of the present invention can contain a small amount of a polyfunctional (meth)acrylate as a crosslinking agent as the component c) to increase the shearing strength of the adhesive.

Examples of the polyfunctional (meth)acrylate are trimethylolpropane tri(meth)acrylate, pentaerythritol tetra(meth)acrylate, 1,2-ethylene glycol di(meth)acrylate, and 1,6-hexanediol di(meth)acrylate.

The polyfunctional (meth)acrylate is used in an amount of up to 5 parts by weight, preferably from 0.1 to 3 parts by weight, per 100 parts by weight of the monomer as the component a). Within the above range, in the case of a di-functional (meth)acrylate, the amount thereof can be increased and in the case of a tri- or more functional (meth)acrylate, the amount thereof can be reduced.

However, if the amount of the polyfunctional (meth)acrylate is more than 5 parts by weight, there is a possibility of undesirable decrease in the adhesive force of the pressure-sensitive adhesive.

Examples of photopolymerization initiator used as the component d) in the composition of the present invention are benzoin ethers such as benzoin methyl ether, benzoin isopropyl ether, etc.; substituted benzoin ethers such as anizoin methyl ether, etc.; substituted acetophenones such as 2,2-diethoxyacetophenone, 2,2-dimethoxy-2-phenoneacetophenone, etc.; substituted α-ketols such as 2-methyl- 2-hydroxypropiophenone, etc.; aromatic sulfonylchlorides such as 2-naphthalenesulfonylchloride, etc.; and light active oximes such as 1-phenone-1,1-propanediol-2-(o-ethoxycarbonyl)oxime, etc.

The photopolymerization initiator is used in an amount of from 0.01 to 5 parts by weight, preferably from 0.05 to 1 part by weight, per 100 parts by weight of the monomer as the component a). If the amount of the photopolymerization initiator is less than 0.01 part, the monomer tends to remain much, while if the amount thereof is more than 5 parts by weight, the molecular weight of the polymer formed is decreased, resulting in decreasing the cohesive force of the pressure-sensitive adhesive.

At the preparation of the composition of the present invention, the monomer as the component a) is first mixed with the photopolymerization initiator as the component d) and the premix is partially polymerized to a coatable syrupy product. Alternatively, the coatable syrupy product may be formed by mixing a thixotropic agent such as fumed silica with the premix of the monomer and the photopolymerization initiator.

The syrupy product is mixed with the radical chain inhibitor as the component b) and the polyfunctional (meth)acrylate as the crosslinking agent as the component c) together with, if necessary, an additional amount of the photopolymerization initiator, to prepare the composition for the photopolymerization. The composition can further contain, if necessary, various conventional additives such as a filler, a pigment, an aging inhibitor, a tackifying resin, etc.

In the present invention, the composition thus prepared is irradiated with ultraviolet rays to provide a photopolymerized product. The irradiation of ultraviolet rays is conducted in an oxygen-free atmosphere replaced with an inert gas such as a nitrogen gas or is conducted in a state of shielding air by coating with an ultraviolet ray-transmitting film.

The ultraviolet rays used for the photopolymerization are electromagnetic radiations having a wavelength range of from about 180 to 460 nm, but electromagnetic radiations having wavelengths longer than or shorter than the above-described wavelength range may be used.

The ultraviolet source used is a general illumination apparatus such as a mercury arc, a carbon arc, a low-pressure mercury lamp, an intermediate pressure mercury lamp, a high-pressure mercury lamp, a metal halide lamp, etc. The intensity of the ultraviolet rays can be property set by controlling the distance between the light source and the composition to be irradiated or the voltage, but in view of the irradiation time (productivity), ultraviolet rays having a weak intensity of from 0.1 to 7 mW/cm$^2$ is preferably used.

The photopolymerization product obtained by the irradiation of ultraviolet rays has a rate of polymerization of usually at least 90% by weight, preferably at least 95% by weight, and has a sufficiently high molecular weight and also a high degree of crosslinking such that the solvent-insoluble content becomes at least 50% by weight, preferably from 70 to 95% by weight, as a result of internal-crosslinking with the crosslinking agent as the component c). However, the photopolymerization product usually contains the residual unreacted monomer in an amount of from 1 to 5% by weight as described above.

The present invention has a great characteristic that the residual monomer is removed by drying under heating to decrease the content less than 10,000 ppm, preferably 5,000 ppm or less.

Thus, the occurrence of swelling and staining of the adhered surface and great decrease in the cohesive force due to the evaporation of the residual monomer at the high-temperature use of the adhesive can be prevented.

Drying by heating is usually conducted using a drying furnace, but in particular, is preferably conducted using a hot-blast circulating drying furnace having a far infrared heater. This is because by heating from the inside with the far infrared heater and by the diffusion from the surface by the circulating hot blast, efficient drying can be performed in a short period of time. The treating time differs according to the faculty of the drying furnace used but may be from several tens seconds to several minutes at a temperature of from about 100° to 150° C.

The photopolymerized product having a solvent-insoluble content of at least 50% by weight and a residual unreacted monomer content of less than 10,000 ppm thus obtained has good, adhesive force, and cohesive force, in particular, a large cohesive force at high temperature, and also has excellent durability and reliability at a long-time high-temperature use. Hence, the photopolymerization product can be widely used for a heat-resistant use at high temperature as a fixing tape for bonding electronic parts or a masking tape in a soldering step as an acrylic pressure-sensitive adhesive having a particularly excellent heat resistance.

The adhesive sheet of the present invention is an adhesive sheet or tape produced by forming the acrylic pressure-sensitive adhesive having excellent heat resistance formed by the method described above on one surface or both surfaces of a substrate.

Porous materials such as nonwoven fabrics, papers, etc., and various kinds of plastic films are used as the substrate. For a heat-resistant use, a heat-resistant film such as a polyimide film, a polyester film, a polytetrafluoroethylene film, a polyether ether ketone film, a polyether sulfone film, a polymethylpentene film, etc., is preferably used. The thickness of the substrate is usually from about 25 to 125 μm and the thickness of the layer of the acrylic pressure-sensitive adhesive formed on the substrate is usually from about 10 to 100 μm.

The production of the adhesive sheet of the present invention can be conducted by, for example, forming the layer of the acrylic pressure-sensitive adhesive having the desired thickness on a releasing liner by the above-described method, and the transferring the layer onto one surface or both surfaces of the substrate. Also, the adhesive sheet of the present invention may be produced by a method comprising directly coating the composition for the photopolymerization on a substrate or impregnating the substrate with the composition, irradiating the coated or impregnated composition with ultraviolet rays to form a photopolymerized product having a solvent-insoluble content of at least 50% by weight, and then drying by heating to decrease the content of the unreacted monomer below 10,000 ppm.

According to the kind of the substrate, a proper method as described above can be employed.

As described above, in the present invention, since the composition comprising a (meth)acrylic acid alkyl ester and containing a specific amount of the radical chain inhibitor together with the photopolymerization initiator and the crosslinking agent is photopolymerized, a highly crosslinked photopolymerized product having a high molecular weight can be obtained by photopolymerizing with a relatively low irradiation intensity different from the conventional technique wherein the by-production of low molecular weight materials is unavoidable by forcibly increasing the rate of polymerization at the photopolymerization.

Furthermore, in the present invention, the residual unreacted monomer in the photopolymerization product in an amount of from 1 to several % by weight is removed by drying under heating to a slight amount of less than 10,000 ppm and hence the photopolymerization product contains neither the low molecular weight materials nor the unreacted monomer reducing the cohesive force. Also, the content of the unreacted monomer evaporated on heating at high temperature is very less. Therefore, the acrylic pressure-sensitive adhesive highly satisfying the adhesive force, and the cohesive force, in particular which has excellent cohesive force at high temperature and good long-time high-temperature stability, and is capable of sufficiently enduring the use in a heat-resistant field can be obtained. Further, an adhesive sheet using the acrylic pressure-sensitive adhesive can be obtained.

The present invention is described in more detail by the following examples, in which all parts, unless otherwise indicated, are by weight.

EXAMPLE 1

A premix was prepared using 60 parts of isononyl acrylate, 28 parts of butyl acrylate, 12 parts of acrylic acid, and 0.1 part of 2,2-dimethoxy-2-phenylacetophenone (Irgacure 651, trade name, made by Ciba-Geigy Corporation) as a photopolymerization initiator. By exposing the premix to ultraviolet rays in a nitrogen gas atmosphere, the premix was partially polymerized to obtain a coatable syrupy product having a viscosity of about 4,500 centipoises.

To 100 parts of the partially polymerized syrupy product were added 4 parts of tetrabismethylene-3-(3'-5'-di-t-butyl-4'-hydroxyphenyl)propionate methane as a radical chain inhibitor and 0.2 part of trimethylolpropane triacrylate as a crosslinking agent followed by mixing to obtain a composition. The composition was coated on a polyimide film having a thickness of 25 μm and photopolymerized by irradiation with ultraviolet rays of 900 mj/cm² by a high-pressure mercury lamp having a light intensity of 5 mW/cm² in a nitrogen gas atmosphere to form a layer of a photopolymerized product having a thickness of 50 μm. The photopolymerized layer thus formed was dried by heating in a hot-blast circulating dryer at 130° C. for 5 minutes to obtain an adhesive sheet.

EXAMPLE 2

By following the same procedure as in Example 1 except that the amount of tetrabismethylene-3-(3'-5'-di-t-butyl-4'-hydroxyphenyl)propionate methane as the radical chain inhibitor was changed to 10 parts, an adhesive sheet was prepared.

EXAMPLE 3

A coatable syrupy product having a viscosity of about 5,000 centipoises was obtained in the same manner as in Example 1 using 90 parts of 2-ethylhexyl acrylate, 10 parts of acrylic acid, and 0.1 part of Irgacure 651 (the photopolymerization initiator described in Example 1).

To 100 parts of the syrupy product were added 4 parts of tetrabismethylene-3-(3',5'-di-t-butyl-4'-hydroxyphenyl)propionate methane as a radical chain inhibitor and 1 part of 1,6-hexanediol diacrylate as a crosslinking agent followed by mixing to obtain a composition. The composition was coated on a polyimide film having a thickness of 25 μm, photopolymerized by irradiating with ultraviolet rays of 900 mj/cm² by a high-pressure mercury lamp having a light intensity of 5 mW/cm² in a nitrogen gas atmosphere to form a layer of the photopolymerized product having a thickness of 50 μm, and then dried by heating in a hot-blast circulating dryer at 130° C. for 5 minutes to obtain an adhesive sheet.

EXAMPLE 4

By following the same procedure as in Example 3 except for using 10 parts of 2,2'-methylenebis(4-methyl-6-t-butylphenol) as the radical chain inhibitor, an adhesive sheet was prepared.

COMPARATIVE EXAMPLE 1

By following the same procedure as in Example 1 except that the radical chain inhibitor was not added, an adhesive sheet was prepared.

COMPARATIVE EXAMPLE 2

By following the same procedure as Example 1 except that drying by heating in the hot-blast circulating dryer was omitted, an adhesive sheet was prepared.

COMPARATIVE EXAMPLE 3

When an adhesive sheet was prepared by following the same procedure as in Example 1 except that the amount of the radical chain inhibitor added was changed to 30 parts, the rate of polymerization of the photopolymerization was as low as 82%. Thus, an adhesive sheet meeting the desired evaluations was not obtained.

COMPARATIVE EXAMPLE 4

By following the same procedure as in Example 3 except that the radical chain inhibitor was not added, an adhesive sheet was prepared.

COMPARATIVE EXAMPLE 5

In a flask were placed 90 parts of 2-ethylhexyl acrylate, 10 parts of acrylic acid, 210 parts of ethyl acetate, and 0.4 part of 2,2'-azobisisobutyronitrile and after sufficiently replacing the inside atmosphere with a nitrogen gas, solution polymerization was conducted by heating the mixture to a temperature of from 60° to 80° C. with stirring to obtain a pressure-sensitive adhesive solution having a viscosity of 120 poises, a rate of polymerization of 99.2% by weight, and solid content of 31.4% by weight.

After adding 2 parts of a polyfunctional isocyanate compound as a crosslinking agent to 100 parts of the solution followed by mixing, the mixture was coated on a polyimide film having a thickness of 25 μm, dried in a hot-blast dryer at 40° C. for 5 minutes, and then dried at 130° C. for 5 minutes to obtain an adhesive sheet having formed thereon an adhesive layer having a dry thickness of 50 μm.

The residual monomer, the residual solvent, and the solvent-insoluble content in the adhesive layer, and the rate of polymerization of the pressure-sensitive adhesive on each of the adhesive sheets prepared in Examples 1 to 4 and Comparative Examples 1, 2, 4, and 5 were measured. The results obtained are shown in Table 1 below.

The measurements were conducted as follows.
[Determination of Residual Evaporating Components]

From each adhesive sheet, 0.5 g of the pressure-sensitive adhesive was sampled and immersed in 20 ml of ethyl acetate for 2 days. After sufficiently extracting the residual monomer and/or the residual solvent, the extract was analyzed by a gas chromatography to determine the residual monomer and/or the residual solvent. The measurement conditions are shown below.

Apparatus: HP-5890A (manufactured by Hewlet Packard Co.)

Column: 0.25 mm (diameter)×30 m (length)

Measurement Temperature: 250° C.

In addition, the confirmation and the quantitative analysis of the residual monomer and the residual solvent were conducted by a mass spectroscopic analysis (GC-MS analysis) after separating by gas chromatography.

[Solvent-Insoluble Content]

After sampling about 2.0 g of the pressure-sensitive adhesive from each adhesive sheet and accurately weighing the sample, the sample was filled in a cylindrical filter paper accurately weighed and an extraction treatment was then conducted with 150 ml of ethyl acetate by a Soxhlet extractor at a temperature of from 80° to 90° C. for 24 hours. After the treatment, the cylindrical filter paper was taken out. The weight thereof after drying was measured and the solvent-insoluble content was calculated by the following formula.

Solvent-Insoluble Content (wt %)=$(A-B)/C \times 100$

A: Weight of the filter paper after drying

B: Weight of the filter paper

C: Weight of the pressure-sensitive adhesive

[Rate of Polymerization]

After sampling $X_1$ g (about 0.1 g) of each product directly after photopolymerization before drying by heating, the sample was stored in a dryer at 130° C. for 3 hours and the weight ($X_2$ g) of the sample was measured again. From the weights $X_1$ and $X_2$, the rate of polymerization was calculated by the following formula.

Rate of Polymerization (%)=$(X_2/X_1) \times 100$ (%)

TABLE 1

|  | Residual Monomer (ppm) | Residual Solvent (ppm) | Solvent-Insoluble Content (wt %) | Rate of Polymerization (%) |
| --- | --- | --- | --- | --- |
| Example 1 | 2,500 | — | 81 | 95.8 |
| Example 2 | 3,000 | — | 77 | 92.6 |
| Example 3 | 1,500 | — | 82 | 95.5 |
| Example 4 | 4,200 | — | 75 | 91.2 |
| Comparative Example 1 | 2,400 | — | 85 | 98.7 |
| Comparative Example 2 | 20,1000 | — | 80 | 95.8 |
| Comparative Example 4 | 1,400 | — | 84 | 98.3 |
| Comparative Example 5 | 120 | 800 | 68 | 99.2 |

On each of the adhesive sheets obtained in Examples 1 to 4 and Comparative Examples 1, 2, 4, and 5, the adhesive force, the retention force, the soldering heat resistance, and the long-time high-temperature stability (heating loss) were determined by the following methods.

[Adhesive Force]

The adhesive force was measured using a stainless steel plate as a material to be adhered according to the method of JIS Z-1522. The adhesive force was shown by g/20 mm width.

[Retention Force]

Each adhesive sheet having a width of 10 mm was adhered to the end portion of a stainless steel plate (30 mm×120 mm×3.0 mm) having a mirror surface at an adhered area of 20 mm×10 mm. After allowing to stand the assembly for 30 minutes, a load of 500 g was applied thereto at 100° C., and the time of falling the tape by slipping was measured. In addition, the mark * in Table 2 shows that the tape falls by the cohesive failure.

[Soldering Heat Resistance]

Each adhesive sheet cut into 10 mm×10 mm was adhered to a stainless steel plate (50 mm×50 mm×0.4 mm) having a mirror surface by a roller with a care of not entering bubbles. After allowing to stand the assembly at room temperature for 30 minutes, the stainless steel plate was floated on molten solder bath at 260° C. with the adhered surface above for 10 seconds.

The adhered state of the adhesive sheet after the treatment was visually observed, and foaming of the adhesive and the occurrence of abnormal adhesion (floating, creases, peeling off, slipping) were evaluated as follows.

○: No change and abnormality

Δ: Slight change and abnormality

×: Great change and abnormality

[Heating Loss]

After placing about 0.1 g of a sample cut from each adhesive tape in a definite aluminum cup, the sample was heated in a hot-blast circulating dryer at 160° C. After 100 hours, the sample was taken out from the dryer together with the aluminum cup, and the heating loss was calculated according to the following formula.

Heating loss (wt %)=$(D-E)/D \times 100$

D: Sample weight (g)

E: Sample weight (g) after drying

In addition, the heating loss corresponds to the long-time high-temperature stability.

TABLE 2

|  | Adhesive Force (g/20 mm width) | Retention Force at 100° C. (min.) | Soldering Heat Resistance | | Heating Loss (Wt %) |
| --- | --- | --- | --- | --- | --- |
|  |  |  | (I) | (II) |  |
| Example 1 | 1,010 | >180 | ○ | ○ | 7.0 |
| Example 2 | 980 | >180 | ○ | ○ | 6.8 |
| Example 3 | 950 | >180 | ○ | ○ | 7.2 |
| Example 4 | 930 | >180 | ○ | ○ | 7.0 |
| Comparative Example 1 | 880 | >180 | ○ | ○ | 37.8 |
| Comparative Example 2 | 1,090 | *8 | × | × | 10.0 |
| Comparative Example 4 | 800 | >180 | ○ | Δ | 44.4 |
| Comparative Example 5 | 830 | *15 | × | × | 21.3 |

(I): Foaming
(II): Abnormal adhesion

As is apparent from the results shown in Table 1 and Table 2, it can be seen that the adhesive sheets of Examples 1 to 4 wherein the solvent-insoluble content and the residual monomer are in the specific ranges defined in the present invention have excellent heat resistant retention at a high temperature and, in particular, in the soldering heat resistance, show the extremely less heating loss which is an index of the long-time high-temperature stability under severe conditions as compared to the samples in the Comparative Examples, and have excellent quality characteristics.

While the invention has been described in detail and with reference to specific embodiments thereof, it will be apparent to one skilled in the art that various changes and modifications can be made therein without departing from the spirit and scope thereof.

What is claimed is:

1. A pressure-sensitive adhesive having excellent heat resistance comprising a photopolymerization product of a composition comprising:
   a) 100 parts by weight of monomers comprising from 70 to 100% by weight of a (meth)acrylic acid alkyl ester having from 2 to 14 carbon atoms in the alkyl moiety, and from 30 to 0% by weight of a monoethylenically unsaturated monomer copolymerizable with the (meth)acrylic acid alkyl ester,
   b) from 0.02 to 20 parts by weight of a radical chain inhibitor,
   c) up to 5 parts by weight of a polyfunctional (meth)acrylate as a crosslinking agent, and
   d) from 0.01 to 5 parts by weight of a photopolymerizable initiator, wherein said photopolymerization product is a dried photopolymerization product, and the amount of any residual unreacted monomer in said dried photopolymerization product is less than 10,000 ppm.

2. The pressure-sensitive adhesive of claim 1, wherein the amount of said radical chain inhibitor is from 0.02 to 10 parts by weight.

3. The pressure-sensitive adhesive of claim 1, wherein the amount of said polyfunctionl (meth)acrylate as a crosslinking agent is from 0.02 to 5 parts by weight.

4. The pressure-sensitive adhesive of claim 1, wherein said photopolymerization product has a solvent-insoluble content of at least 50% by weight.

5. The pressure-sensitive adhesive of claim 1, wherein the photopolymerization product before drying has a rate of polymerization of at least 90% by weight.

6. A method for producing a pressure-sensitive adhesive having excellent heat resistance, comprising:

(1) photopolymerizing by irradiating with ultraviolet rays a composition comprising:
   a) 100 parts by weight of monomers comprising from 70 to 100% by weight of a (meth)acrylic acid alkyl ester having from 2 to 14 carbon atoms in the alkyl moiety, and from 30 to 0% by weight of a monoethylenically unsaturated monomer copolymerizable with the (meth)acrylic acid alkyl ester,
   b) from 0.02 to 20 parts by weight of a radical chain inhibitor,
   c) up to 5 parts by weight of a polyfunctional (meth)acrylate as a crosslinking agent, and
   d) from 0.01 to 5 parts by weight of a photopolymerizable initiator; and (2) drying the resulting product by heating so as to obtain a dried photopolymerization product wherein the amount of any residual unreacted monomer in said dried photopolymerization product is less than 10,000 ppm.

7. The method of claim 6, wherein the amount of the radical chain inhibitor is from 0.02 to 10 parts by weight.

8. The method of claim 6, wherein the amount of the polyfunctional (meth)acrylate as a crosslinking agent is from 0.02 to 5 parts by weight.

9. The method of claim 6, wherein the resulting photopolymerization product of step (1) has a rate of polymerization of at least 90% by weight.

10. The method of claim 6, wherein the resulting photopolymerization product of step (1) has a solvent-insoluble content of at least 50% by weight.

* * * * *